United States Patent
Krishnamurthy et al.

(10) Patent No.: US 7,548,933 B2
(45) Date of Patent: Jun. 16, 2009

(54) SYSTEM AND METHOD FOR EXPLOITING SEMANTIC ANNOTATIONS IN EXECUTING KEYWORD QUERIES OVER A COLLECTION OF TEXT DOCUMENTS

(75) Inventors: Rajasekar Krishnamurthy, Sunnyvale, CA (US); Sriram Raghavan, San Jose, CA (US); Shivakumar Vaithyanathan, Sunnyvale, CA (US); Huaiyu Zhu, Union City, CA (US)

(73) Assignee: International Business Machines Corporation, Armonk, NY (US)

( * ) Notice: Subject to any disclaimer, the term of this patent is extended or adjusted under 35 U.S.C. 154(b) by 246 days.

(21) Appl. No.: 11/251,382

(22) Filed: Oct. 14, 2005

(65) Prior Publication Data

US 2007/0088734 A1   Apr. 19, 2007

(51) Int. Cl.
 G06F 7/00       (2006.01)
 G06F 17/00      (2006.01)
 G06F 17/30      (2006.01)
(52) U.S. Cl. .......................................... 707/102; 707/3
(58) Field of Classification Search ..................... 707/3, 707/102
 See application file for complete search history.

(56) References Cited

U.S. PATENT DOCUMENTS

| | | | | |
|---|---|---|---|---|
| 5,265,065 | A | * | 11/1993 | Turtle .............................. 707/4 |
| 5,812,840 | A | * | 9/1998 | Shwartz .......................... 707/4 |
| 6,138,085 | A | * | 10/2000 | Richardson et al. ............. 704/1 |
| 6,651,058 | B1 | | 11/2003 | Sundaresen et al. |
| 6,718,063 | B1 | | 4/2004 | Lennon et al. |
| 6,738,767 | B1 | | 5/2004 | Chung et al. |
| 2002/0059289 | A1 | | 5/2002 | Wenegrat et al. |
| 2003/0217052 | A1 | * | 11/2003 | Rubenczyk et al. ............. 707/3 |
| 2004/0243560 | A1 | | 12/2004 | Broder et al. |
| 2005/0108630 | A1 | * | 5/2005 | Wasson et al. ............... 715/513 |
| 2005/0267871 | A1 | * | 12/2005 | Marchisio et al. ............... 707/3 |
| 2006/0047646 | A1 | * | 3/2006 | Maluf et al. .................... 707/4 |

OTHER PUBLICATIONS

C. Rocha, et al., "A Hybrid Approach for Searching in the Semantic Web," WWW 2004 (May 17-22, 2004), pp. 374-383.
L. Ding et al., "Swoogle: A Search and Metada Engine for the Semantic Web," CIKM 2004 (Nov. 8-13, 2004), pp. 652-659.
S. Amer_Yahya, et al., "TeXQuery: A Full-Text Search Extension to XQuery," WWW 2004 (May 17-22, 2004), pp. 583-594.

* cited by examiner

*Primary Examiner*—Mohammad Ali
*Assistant Examiner*—Alexey Shmatov
(74) *Attorney, Agent, or Firm*—Shimokaji & Associates, P.C.

(57) ABSTRACT

A query interpretation system exploits semantic annotations in keyword queries over a collection of text documents, casting semantic annotations produced by text analysis engines into a formal annotation type system. The system uses the annotation type system to enumerate various interpretations of a keyword query and automatically translate a keyword query into a set of interpretations expressed in some intermediate query language. The system returns a result list of documents by combining the results of executing one or more of these interpretations. Even though the system generates and uses a complex type system, a user is able to use simple keyword queries to locate documents.

14 Claims, 8 Drawing Sheets

SYSTEM AND METHOD FOR EXPLOITING SEMANTIC ANNOTATIONS IN EXECUTING KEYWORD QUERIES OVER A COLLECTION OF TEXT DOCUMENTS

FIELD OF THE INVENTION

The present invention generally relates to query systems and in particular, the present system relates to querying documents that are associated with semantic annotations. More specifically, the present system pertains to modeling such annotations as a type system and translating keyword queries into one or more complex queries against the this type system.

BACKGROUND OF THE INVENTION

Conventional information retrieval systems (also known as text retrieval systems or text search engines) view document collections as standalone text corpora with little or no structured information associated with them. However, there are two primary reasons why such a view is no longer tenable. First, modern enterprise applications for customer relationship management, collaboration, technical support, etc., regularly create, manipulate, and process data that contains a mix of structured and unstructured information. In such applications, there is inherently a fair amount of structured information associated with every document. Second, advances in natural language processing techniques has led to the increased availability of powerful and accurate text analysis engines. These text analysis engines are capable of extracting structured semantic information from text. Such semantic information, usually extracted in the form of semantic annotations, has the potential to significantly improve the quality of free text search and retrieval.

However, the architectures of conventional information retrieval systems are not explicitly designed to take advantage of semantic annotations. In particular, semantic annotations provide the capability for describing content in terms of types and relationships, that is concepts that are not intrinsic to conventional information retrieval systems. For example, a particular document in a corpus may contain a person name "John" and a telephone number for John: "555-1234", but not the actual word "telephone". A person may search on that corpus using the keyword phrase "John telephone". However, a conventional retrieval system does not find the document since the keyword "telephone" is not present. In essence, conventional information retrieval systems merely recognize keywords but not the types into which a word or phrase may be categorized or the relationships between such types.

A conventional information retrieval system is typically designed to return a ranked list of matching documents in response to a keyword search query comprising search words or tokens. In a standard implementation of such a system, an entire corpus of documents is processed in advance to build an inverted index. This inverted index maps each token to a list of occurrences of that token. A token is usually a word or a phrase; however, a token can also be a more complex entity.

Upon receiving a keyword query, the inverted index is used to compute a list of candidate documents that are potentially relevant to the query. Each of these candidate documents is assigned a rank, using a pre-designed ranking formula. The rank ordered list of candidate documents is then presented to the user. Although this technology has proven to be useful, it would be desirable to present additional improvements. The tightly integrated architecture of conventional information retrieval systems directly maps a query to storage and index structures. Consequently, it becomes difficult to exploit available semantic annotations. In conventional information retrieval systems, the available semantic annotations can only be exploited in an ad-hoc fashion by hand crafting specialized ranking formulae. Such ad-hoc ranking formulae are difficult to construct and are very often not portable across document collections. As a result, every time an information retrieval system is deployed over a new document collection, a significant amount of time and effort is required to craft a ranking formulae appropriate to that collection.

What is therefore needed is a system, a computer program product, and an associated method for exploiting semantic annotations in executing keyword queries over a collection of text documents, allowing a user to search on a corpus and locate information based on types and relationships found in the corpus by, for example, a text analysis engine. The need for such a solution has heretofore remained unsatisfied.

SUMMARY OF THE INVENTION

The present invention satisfies this need, and presents a system, a service, a computer program product, and an associated method (collectively referred to herein as "the system" or "the present system") for exploiting semantic annotations in executing keyword queries over a collection of text documents. The present system comprises an architecture and an associated query expansion algorithm for systematically and meaningfully exploiting semantic annotations.

The present system casts semantic annotations produced by text analysis engines into a formal annotation type system. Using the annotation type system, the present system translates a keyword query into a set of queries in an intermediate query language. Each of these intermediate queries is a specific interpretation of the original keyword query. In turn, each interpretation returns a list of documents when executed over the underlying annotated document collection.

Thus, the present system replaces the conventional one-stage retrieval model (keywords directly produce result documents) with a two-stage retrieval model (keywords producing interpretations which in turn produce documents). A key advantage of the present system is that even though a complex and powerful type system is used to model semantic annotations, a user is able to continue to use simple keyword queries to locate documents. All of the complex queries against the type system are automatically generated.

The present system provides a formal algorithm for exploiting semantic annotations, as opposed to conventional ad-hoc implementations based on ranking functions, thresholds, weights, etc. Since the present system employs a keyword search interface, there is no additional burden on the user to learn complex query languages over annotated text. The present system is easily generalized to take advantage of more complex annotations such as relationship annotations and co-reference resolution annotations.

The query execution architecture of the present system separates the semantic interpretation of document content (achieved through text analysis) from the semantic interpretation of keyword queries (achieved using the query expansion algorithm of the present system). This results in a more flexible architecture. Using the present system, a set of text analytic engines can be executed over an existing document collection and the results can be seamlessly used without changing any index structure, ranking algorithm, or query evaluation system. This is difficult to achieve using a conventional monolithic information retrieval architecture.

The present system comprises a modeler for generating a type system from the outputs generated by one or more text analysis engines, an annotation type system representing concepts that can be identified in a corpus of data, and an indexer for generating an interpretation index from the type system and the output of the text analysis engines. The present system further comprises an interpreter for translating a keyword search query into one or more precise interpretations, based on matching the keywords with the values in the interpretation index.

The present system may be embodied as an annotation-enhanced text retrieval system. The present invention provides means for the user to identify a set of documents to be queried. The present invention further provides means for the user to generate a type system, either automatically through analysis of the set of documents, or as specified by the user. The present invention provides means for the user to build an interpretation index over this type system. In addition, the present system provides means for the user to invoke the interpreter to interpret keyword queries and to retrieve documents matching the generated interpretations.

BRIEF DESCRIPTION OF THE DRAWINGS

The various features of the present invention and the manner of attaining them will be described in greater detail with reference to the following description, claims, and drawings, wherein reference numerals are reused, where appropriate, to indicate a correspondence between the referenced items, and wherein:

DETAILED DESCRIPTION OF PREFERRED EMBODIMENTS

The following definitions and explanations provide background information pertaining to the technical field of the present invention, and are intended to facilitate the understanding of the present invention without limiting its scope:

Entity Concept: Any semantic concept, instances of which are mentioned one or times in a document corpus, recognized, and extracted by a text analysis engine, is called an entity concept. For instance, given a collection of customer service reports mentioning names and contact information for various customers, examples of entity concepts include Persons, Organizations, Phone Numbers, Locations, etc.

Relationship Concept: A relationship between two or more entity concepts that is explicitly represented at least once in a given document corpus is called a relationship concept. For instance, given the entity concepts listed above, the relationship "Contact Number" that associates a given Person entity with a Phone Number entity that represents that person's phone number is an example of a Relationship Concept.

Type: A type is any formal representation of an entity or relationship concept using the modeling concepts of some standard data model. For instance, using the relational data model, a type can be viewed as a relation whereas using an object oriented data model, a type can be viewed as a "class". The exact representation for a type is specific to a particular embodiment of this invention.

Attribute: Every type is associated with a set of one or more attributes that define the values associated with objects of that type. For instance, a Person type could be associated with attributes First name and Last name so that every object of that Person type has First name and Last name values.

Figure 1:
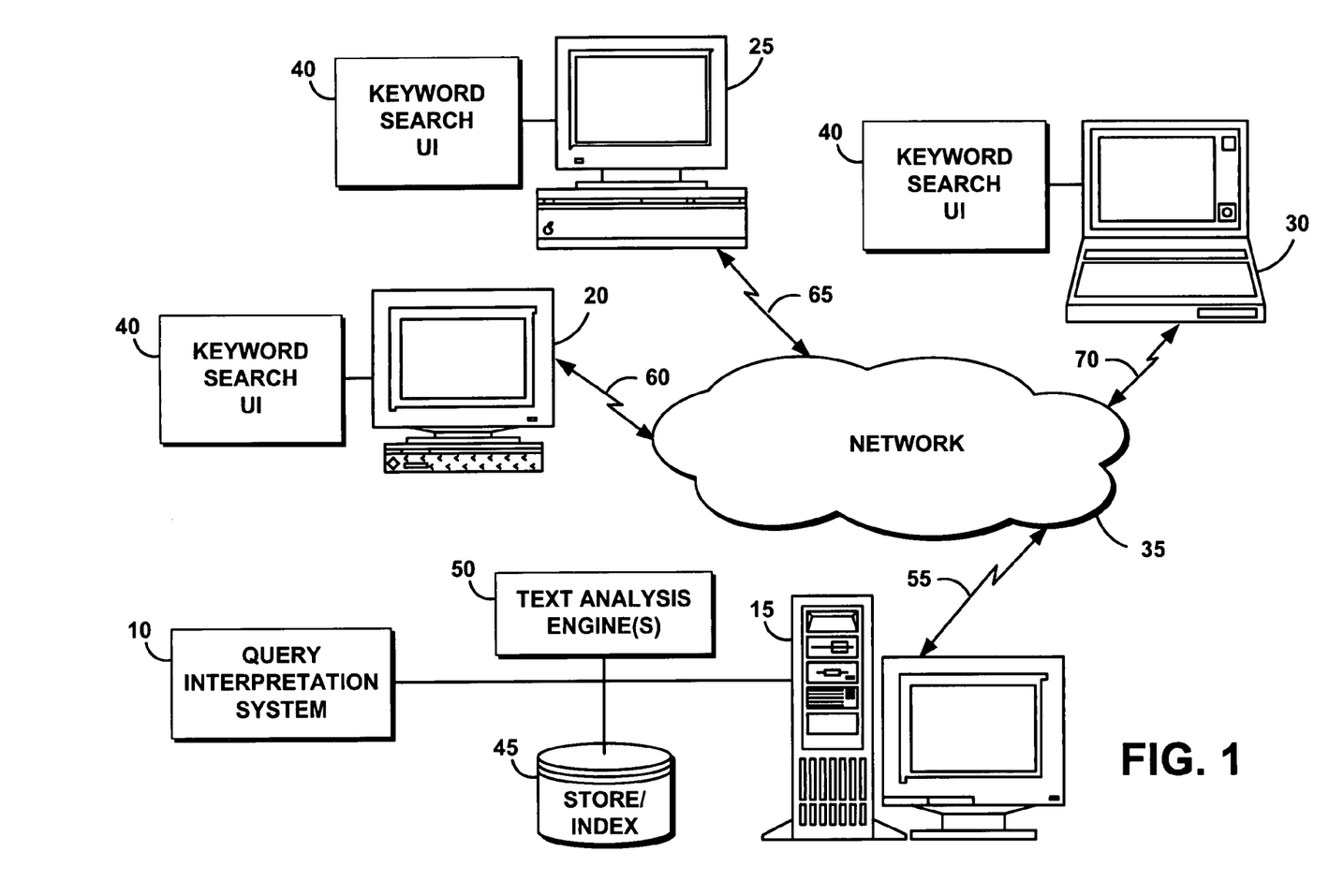
FIG. 1 is a schematic illustration of an exemplary operating environment in which a query interpretation system of the present invention can be used.

FIG. 1 portrays an exemplary overall environment in which a system, a computer program product, and associated method (the "system 10") for exploiting semantic notations in executing keyword queries over a collection of documents according to the present invention may be used. System 10 comprises a software programming code or a computer program product that is typically embedded within, or installed on a host server 15. Alternatively, system 10 can be saved on a suitable storage medium such as a diskette, a CD, a hard drive, or like devices.

Users, such as remote Internet users, are represented by a variety of computers such as computers 20, 25, 30, and can access the host server 15 through a network 35 by means of, for example, a keyword search user interface (UI) 40. By utilizing a keyword search application such as the keyword search UI 40, a user can search data stored in store/index 45.

The store/index 45 can support standard keyword queries over documents as well as more complex precise queries (e.g., using XPath) over annotations. In one embodiment, the store/index 45 comprises multiple individual data management engines. One data management engine comprises an XPath-capable XML data store for the annotations and another data management engine comprises a standard information retrieval engine for keyword queries over the documents.

Computers 20, 25, 30 each comprise software that allows the user to interface securely with the host server 15. The host server 15 is connected to network 35 via a communications link 55 such as a telephone, cable, or satellite link. Computers 20, 25, 30, can be connected to network 35 via communications links 60, 65, 70, respectively. While system 10 is described in terms of network 35, computers 20, 25, 30 may also access system 10 locally rather than remotely. Computers 20, 25, 30 may access system 10 either manually, or automatically through the use of an application such as the keyword search UI 40. While system 10 is described in terms of the keyword search UI 40, it should be clear that computers 20, 25, 30 can access a keyword search interface implemented on the host server 15 via network 35.

Figure 2:
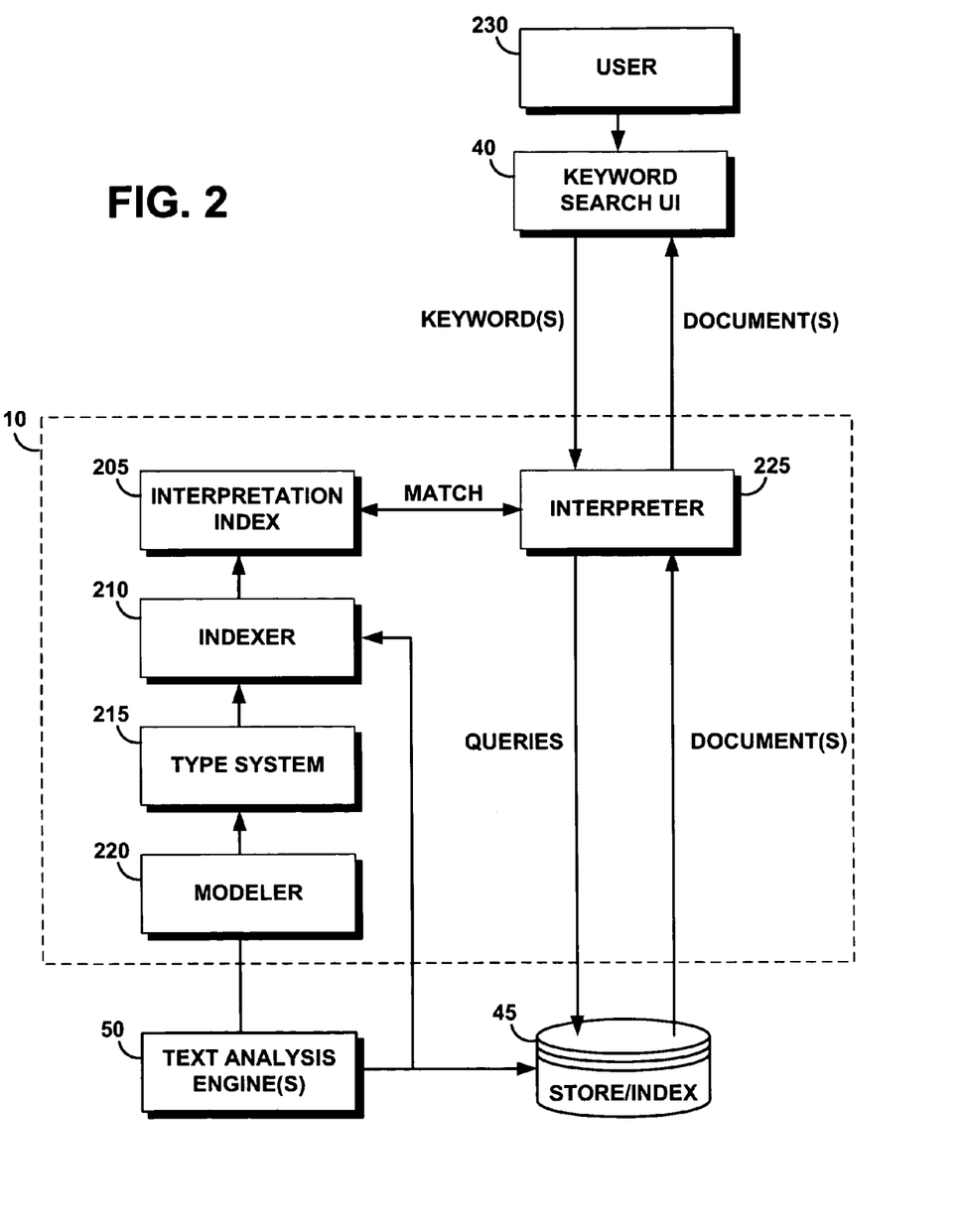
FIG. 2 is a block diagram of the high-level architecture of the query interpretation system of FIG. 1.

FIG. 2 illustrates a high-level hierarchy of system 10. System 10 comprises an interpretation index 205, an indexer 210, a type system 215, a modeler 220, and an interpreter 225. During off-line processing, the text analysis engines 50 execute a suite of pre-selected text analysis engines over a document collection in store/index 45, producing annotations for the analyzed documents. The annotations produced by the text analysis engines 50 are serialized into a meaningful format that allows for efficient indexing and query-based retrieval.

The serialized annotations and the original documents are stored in the store/index 45. For instance, annotations can be serialized into XML documents and stored in store/index 45; in this case store/index 45 is capable of efficiently supporting XPath queries. In addition to serialization, annotations are cast into a formal type system 215 and the interpretation index 205 is built over the type system 215.

Upon receiving a keyword query from the keyword search UI 40, the interpreter 225 matches the keyword query with the interpretation index 205 to generate a set of intermediate queries. For instance, user 230 formulates a search with two keyword queries, k1 and k2. System 10 interprets the query as five intermediate queries q1, q2, q3, q4, and q5. System 10 executes each of these intermediate queries over the store/index 45 to produce a list of documents. The interpreter 225 merges these individual lists and produces a single output list that is presented to user 230. While system 10 is described for illustration purpose only with respect to intermediate queries expressed in SQL-like syntax, it should be clear that system 10 is applicable as well to, for example, any other query language of similar or higher expressive power.

An exemplary scenario comprising service reports from a customer relationship management database of an auto manufacturer illustrates operation of system 10. Table 1 lists exemplary text analysis engines 50 that are executed over the exemplary database. Each annotation produced by these exemplary text analysis engines 50 is a structured object. Modeler 220 represents the output of the text analysis engines 50 as types, with each type having one or more named attributes.

TABLE 1

Exemplary text analysis engines and their associated purpose in extracting annotations from the exemplary data collection.

| Text Analysis Engine | Purpose |
| --- | --- |
| Named-Entity Person | Identifies names of persons occurring in text |
| Named-Entity Organization | Identifies names of organizations occurring in text |
| Named-Entity City/Location | Identifies names of cities or other locations occurring in the text |
| Contacted | Links a Person p with an Organization o if the text indicates that p contacted o |
| Partner | Identifies those organizations that are partners of the auto manufacturer and lists an associated department for that partner |
| Topic | Identifies service reports that refer to engine problems or brake problems |

Figure 3:
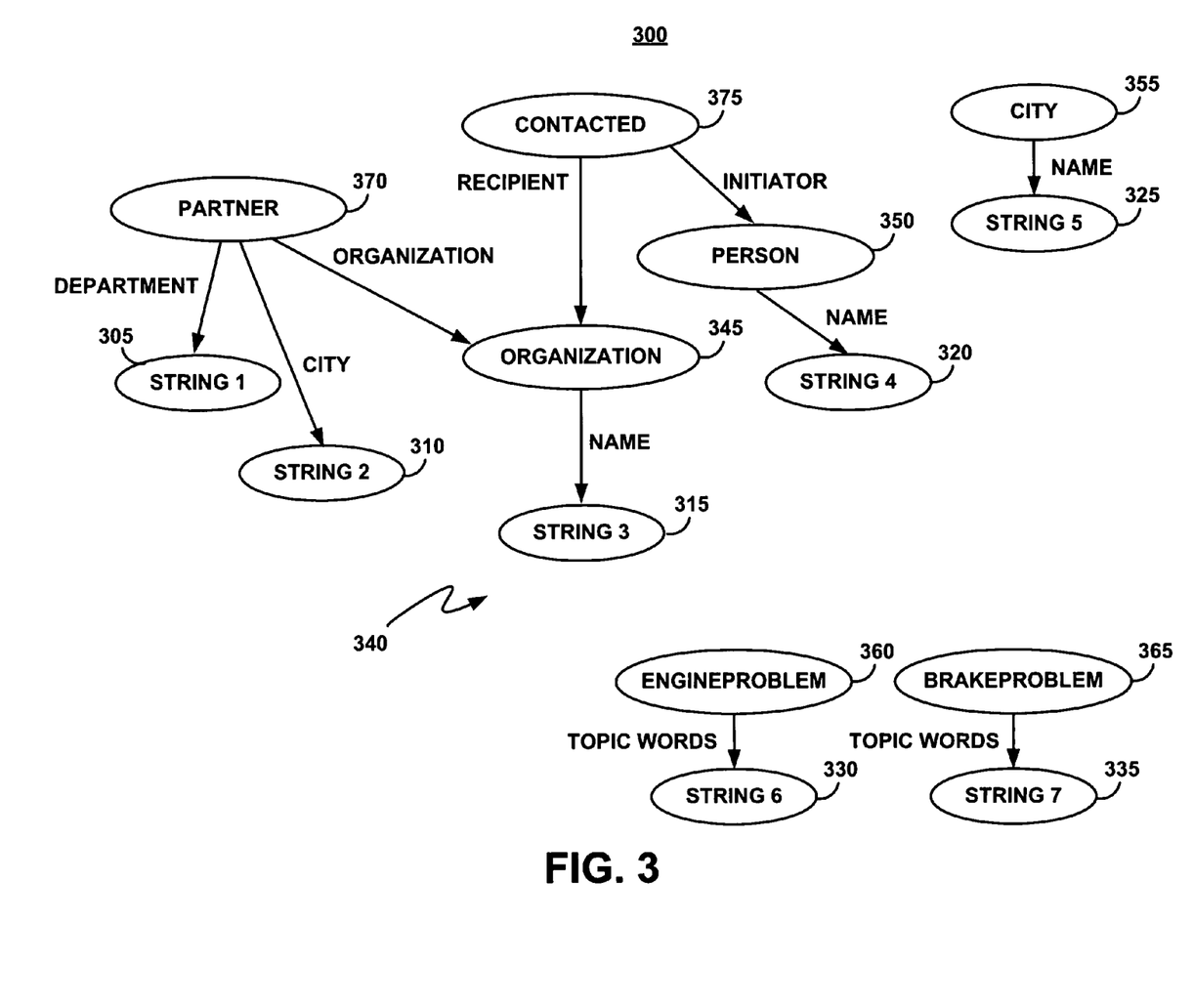
FIG. 3 is a diagram of an exemplary type system of the query interpretation system of FIGS. 1 and 2.

FIG. 3 illustrates an exemplary type system 300 that describes the annotation objects produced by the exemplary text analysis engines 50 when executed on the customer relationship management database. Each of the text analysis engines 50 analyzes the customer relationship management database for different concepts; i.e., department, city, organization name, person name, city name, engine problem, and brake problem. Table 2 illustrates exemplary instances of this type system including the strings that are generated by the text analysis engines 50.

TABLE 2

Exemplary strings generated by the text analysis engines for an exemplary customer relationship management database.

| Type | Attribute | String | Values |
| --- | --- | --- | --- |
| Partner | Department | String 1 | Engine<br>Axle<br>Brake<br>Tires |
| City | Name | String 2 | LA<br>Boston<br>NY |
| Organization | Name | String 3 | Firestone<br>GM<br>National Ins. |
| Person | Name | String 4 | Jane<br>Sue<br>John Smith |
| City | Name | String 5 | San Jose, CA<br>New York<br>Boston, MA |
| Engine Problem | Topic words | String 6 | fuel injection<br>cylinder |
| Brake Problem | Topic words | String 7 | brake shoes<br>brake pads<br>master cylinder |

The text analysis engines 50 generate string 1, 305, string 2, 310, string 3, 315, string 4, 320, string 5, 325, string 6, 330, and string 7, 335 (collectively referenced as strings 340). Modeler 220 analyzes the outputs of the text analysis engines 50 and generates the type system 300 shown in FIG. 3. Modeler 220 assigns attributes to each of the strings 340 as shown in Table 2. Each of the strings 340 is assigned to an entity concept or a relationship concept. A relationship concept relates strings or entity concepts. In FIG. 3, entity concepts comprise organization 345, person 350, city 355, EngineProblem 360, and BrakeProblem 365. Relationship concepts comprise partner 370 and contacted 375. Values of the strings are referenced as attribute values.

Indexer 210 builds an interpretation index 205 (I) over the exemplary set of all names of types (e.g., Person, Organization, EngineProblem, . . . ), attribute names (e.g., city, department, . . . ), and attribute values (e.g., GM, Jane, National Ins., . . . ), such that given a keyword w, I(w) returns one or more of the following:

[type T]: w matches the name of a type T in the object model, and

[val T.y]: w matches the value of an attribute y of type T.

In the preceding definition, string matches can be fuzzy. In particular, interpreter 225 can employ standard information retrieval techniques for approximate matches such as, for example, stemming, stop-word elimination, relaxed capitalization, substring matches, synonym expansion, etc.

Depending on the precise implementation, interpreter 225 determines exemplary matches of keywords as shown in Table 3.

TABLE 3

Exemplary matches shown are generated by interpreter 225 for keywords in the exemplary type system of the exemplary customer relationship management database.

| Keyword | Matches |
| --- | --- |
| National | [val Organization.name] |
| Jane | [val Person.name] |
| engine | [type EngineProblem] |
| engine | [val Partner.dept] |
| LA | [val Partner.city] |
| LA | [val City.name] |

Interpreter 225 tokenizes a query provided by user 230 to generate one or more tokens and attempts to match those tokens with the interpretation index 205. For instance, consider the keyword query "Jane GM". Interpreter 225 generates two tokens "Jane" and "GM" and probes the interpretation index 205 for matches. Interpreter 225 identifies matches in [val Person.name] and [val Organization.name] respectively. Furthermore, each token can be treated as a keyword without imposing any additional semantics. The interpreter 225 denotes this default match using the notation [kwd Jane] and [kwd GM] respectively.

Interpreter 225 generates queries by taking one or more possible combinations of matches for each keyword. For this example, interpreter 225 generates the following queries shown below in SQL-like syntax:

Query (1,1): return documents that mention person Jane and organization GM.
 select d
 from Document d, Person p, Organization o
 where d=p.doc=o.doc AND
  MATCH(p.name, Jane) AND MATCH(o.name, GM)

Query (1,2): return documents that mention person Jane and keyword "GM".
 select d
 from Document d, Person p
 where d=p.doc AND MATCH(p.name, Jane) AND SEARCH(d, "GM")

Query (2,1): return docs that match keyword Jane and organization GM.
 select d
 from Document d, Organization o
 where d=o.doc AND MATCH(o.name, GM) AND SEARCH(d, "Jane")

Query (2,2): return docs that match keywords "Jane GM".
 select d
 from Document d, Person p
 where SEARCH(d, "Jane GM")

Query (2,2) is a conventional keyword search query. In general, since a [kwd] match exists for every query token, the query expansion technique of interpreter 225 generates the standard keyword search query as a special case for all queries. Thus, the interpretations produced by the query expansion technique of the present invention subsume a standard retrieval engine that is based purely on keyword matches.

Interpreter 225 makes additional use of the type system 300 represented in FIG. 3 to derive more sophisticated interpretations of the keyword query. Query (1,1) was generated using the matches [val Person.name] and [val Organization.name]. The type system 300 comprises a type "Contacted"; "Contacted comprises attributes of type "Person" and "Organization". Interpreter 225 generates a modified version of Query (1,1) using the type "Contacted" and replacing each "Person" with Contacted.initiator and "Organization" with Contacted.recipient. The generated query becomes:

Query (1,1)': return docs that mention person Jane contacted organization GM.
 select d
 from Document d, Contacted c
 where d=c.initiator.doc=c.recipient.doc AND
  MATCH(c.initiator.name, Jane) AND MATCH(c.recipient.name, GM)

In the exemplary type system 300 shown in FIG. 3, there is only one type "Contacted" with the requisite characteristics to replace "Person" and "Organization". In general, there can be more than one such type. Furthermore, interpreter 225 can extend this technique to look for higher-order relationships (as opposed to an immediate ancestor) in the type graph of a type system 215. Interpreter 225 uses a "shared ancestor rule" to discover higher-order relationships.

The shared ancestor rule for query generation is as follows: Given a query "$k_1 k_2$" such that keyword $k_1$ has a match of the form [val T1.x], keyword $k_2$ has a match of the form [val T2.y], and there exists a type T with attributes "a" and "b" such that T.a is of type T1 and T.b is of type T2, interpreter 225 can generate the following query:
 select d
 from Document d, T t
 where t.a.doc=t.b.doc=d AND
  MATCH(t.a.x, $k_1$) AND MATCH(t.b.y, $k_2$)

As another example, consider a keyword "Engine LA". Interpreter 225 generates tokens for the keyword and identifies matches as follows:
 Engine: type EngineProblem
  val Partner.dept
  kwd Engine
 LA: val City.name
  val Partner.city
  kwd LA Interpreter 225 generates an exemplary query for keyword "Engine LA" as follows:

Query (2,2): return docs that mention an engine partner and a partner located in LA.
 select d
 from Document d, Partner p1, Partner p2
 where d=p1.org.doc=p2.org.doc AND
  MATCH(p1.dept, Engine) AND MATCH(p2.city, LA)

Interpreter 225 employs a type-merging rule to merge the instances of "Partner" (p1 and p2) into a single "Partner" instance, generating the following query:

Query (2,2)': return docs that mention an engine partner located in LA.
 select d
 from Document d, Partner p
 where d=p.org AND MATCH(p.dept, Engine) AND MATCH(p.city, LA)

More generally, the type-merging rule can be stated as follows: Given a query "$k_1 k_2$" such that keyword $k_1$ has a match of the form [val T.x] and keyword $k_2$ has a match of the form [val T.y], interpreter 225 can generate a query:
 select d
 from Document d, T t
 where t.doc=d AND MATCH(t.x, $k_1$) AND MATCH (t.y, $k_2$)

Figure 4:
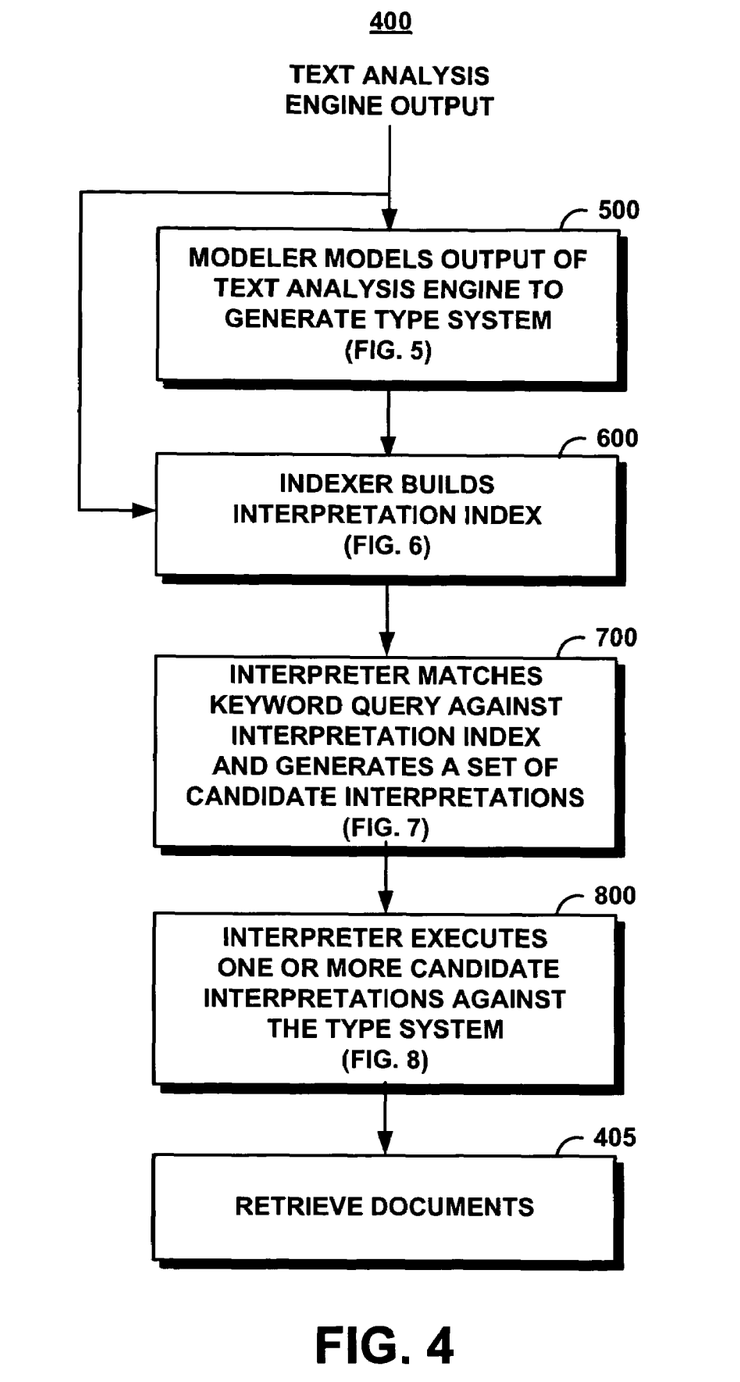
FIG. 4 is a process flow chart illustrating a method of operation of the query interpretation system of FIGS. 1 and 2.

FIG. 4 illustrates a method 400 of system 10 in generating a type system for a collection of documents comprising annotations and executing a query against that collection of documents. Each of the text analysis engines 50 generates one or more character strings per document analyzed by the text analysis engine 50. The modeler 220 models output of the text analysis engines 50 to generate the type system 215 (step 500, further described in FIG. 5). Indexer 210 builds an interpretation index 205 from the type system 215 (step 600, further described in FIG. 6). Interpreter 225 considers a keyword query provided by user 230 and generates a set of candidate interpretations for the keyword query (step 700, further described in FIG. 7). Interpreter 225 executes one or more candidate interpretations against the type system 215 represented in the interpretation index 205 (step 800, further described in FIG. 8). The interpreter 225 retrieves matching documents from the store/index 45 (step 405). Step 500 and step 600 comprise an "offline" document analysis process that is performed prior to query execution by system 10. Step 700, step 800, and step 405 are performed "online" during query execution by system 10.

The type system 215 is a structure representing annotations generated by the text analysis engines 50 from data in the store/index 45. Annotations are, for example, strings representing data found in a document. The type system 215 comprises concepts. Concepts are entity concepts or relationship concepts. The relationship concept describes a relationship between selected entity concepts. For example, a "contact" relationship concept may describe a relationship between a person entity concept and a phone number entity concept. The type system 215 provides a structure for the annotations that enables complex queries against data in the store/index 45. The type system 215 is a specific instance of a model for annotations of the data in store/index 45.

Figure 5:
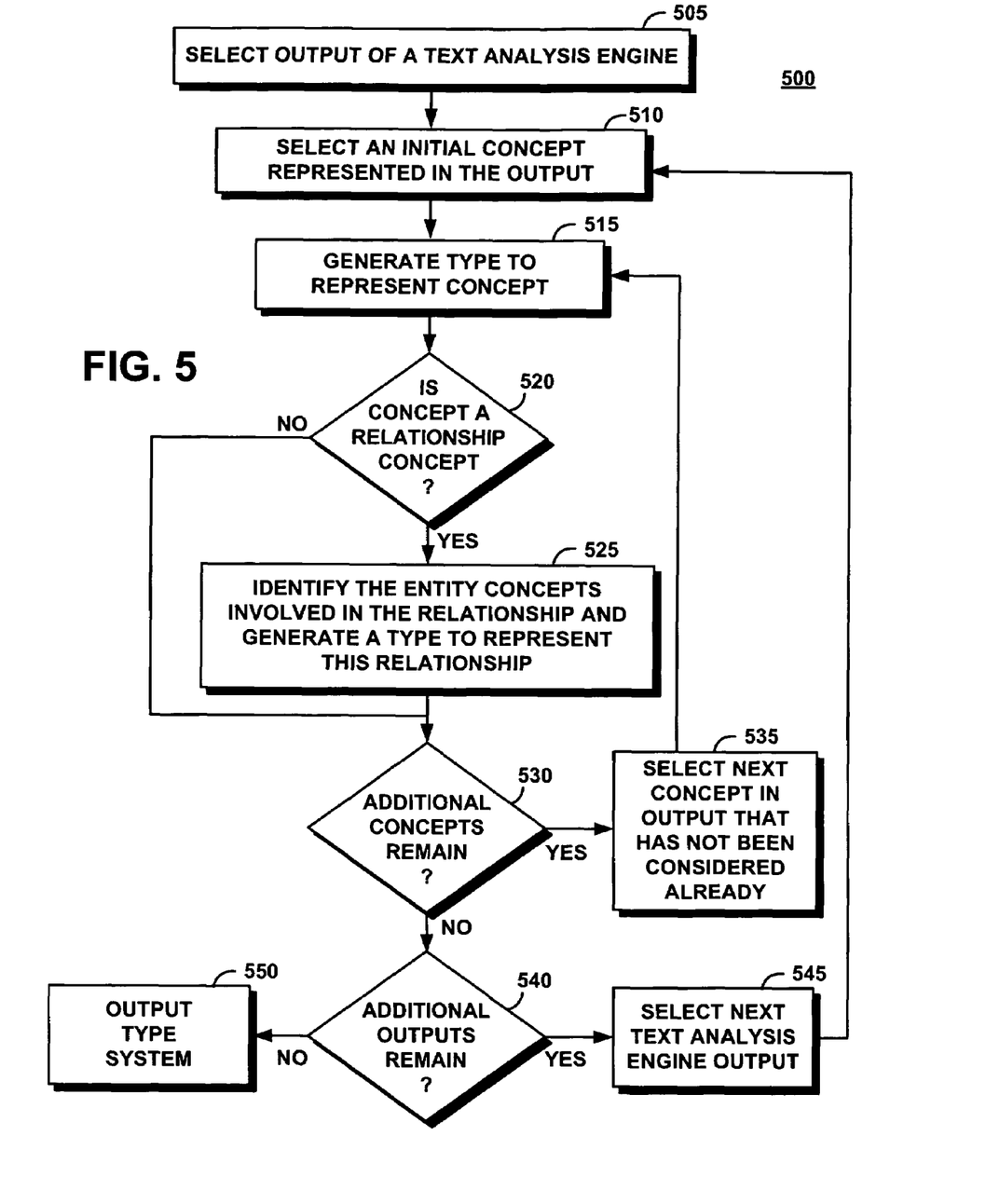
FIG. 5 is a process flow chart illustrating a method of operation of the query interpretation system of FIGS. 1 and 2 in generating a type system.

FIG. 5 illustrates a method 500 by which modeler 220 generates the type system 215 from annotations provided by the text analysis engines 50. Method 500 can be performed manually by a human, automatically by an application, or manually with assistance from an application.

Modeler 220 selects output of one of the text analysis engines 50 (step 505). The output of each of the text analysis engines 50 comprises one or more concepts. Modeler 220 selects an initial concept for the selected output (step 510).

Modeler 220 generates a type to represent the selected concept (step 515), with one type per concept. Generating a type comprises naming the type as an entity or a relationship and identifying one or more attributes for the type. The modeler 220 determines whether the selected concept is a relationship concept (decision step 520). For example, a selected concept may be an entity concept Person; another selected concept may be an entity concept Phone number". Person and Phone number can be related by a relationship concept Contact. If the selected concept is a relationship (decision step 520), modeler 220 identifies the relationship concept and associated entity concepts (step 525). For example, modeler 220 may identify "contact" as a relationship concept, with associated entity concepts as person and phone number.

After identifying the relationship concept and associated entity concepts (step 525) or if the selected concept is not a relationship (decision step 520), modeler 220 determines whether additional concepts remain for processing from the selected output of the selected text analysis engine 50 (decision step 530). If additional concepts remain for processing, modeler 220 selects a next concept (step 535) and repeats step 515 through step 530 until no concepts from the selected output of the text analysis engine 50 remain for processing.

Modeler 220 determines whether additional outputs of the selected text analysis engines 50 remain for processing (decision step 540). If additional outputs remain, modeler 220 selects a next output for a text analysis engine 50 (step 545). The selected output can be from the same text analysis engine 50 as just processed or another text analysis engine 50. Modeler 220 repeats step 510 through step 545 until no additional outputs remain for processing (decision step 540). Modeler 220 outputs the generated type system 215 (step 550).

Figure 6:
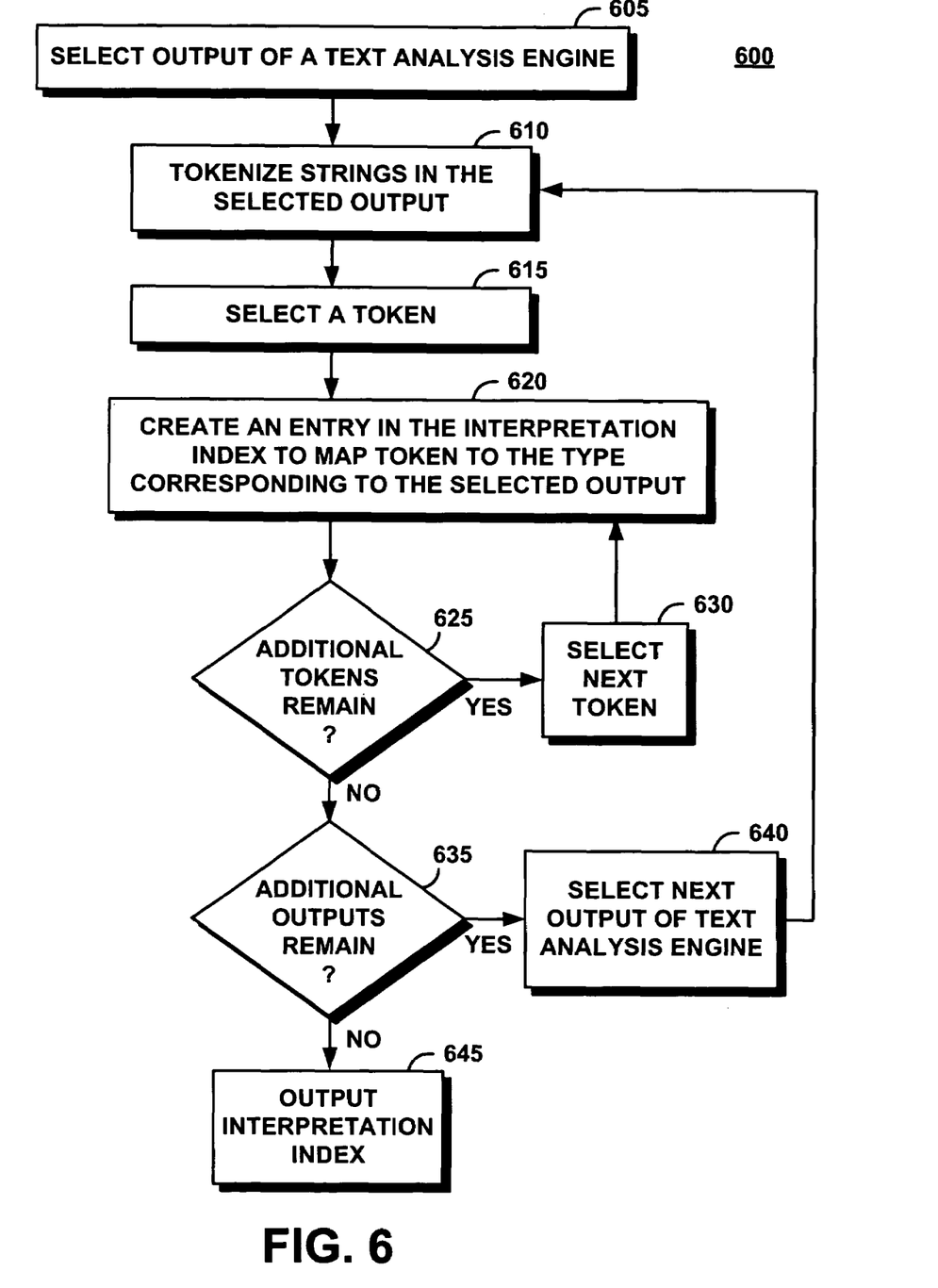
FIG. 6 is a process flow chart illustrating a method of operation of the query interpretation system of FIGS. 1 and 2 in building an interpretation index 205.

FIG. 6 illustrates a method 600 by which indexer 210 generates an interpretation index 205. Input to indexer 210 is the output of the text analysis engines 50 and the type system 215. Indexer 210 selects an output of the text analysis engine 50 (step 605). Indexer 210 tokenizes strings in the selected output (step 610). Indexer 210 selects a token from the tokenized strings in the selected output (step 615). The indexer places an entry in the interpretation index that maps the selected token to the type in the type system 215 that represents the text analysis engine output selected in step 605.

Indexer 210 determines whether additional tokens remain for analysis (decision step 625). If yes, indexer 210 selects a next token (step 630) and repeats step 620 through step 630 until no additional tokens remain for processing.

Indexer 210 determines whether additional outputs from text analysis engines 50 remain for processing (decision step 635). If yes, indexer 210 selects a next output of a text analysis engine 50 (step 640) and repeats step 610 through step 640 until no additional outputs remain for processing. Indexer 210 outputs the generated interpretation index 205 (step 645).

Figure 7:
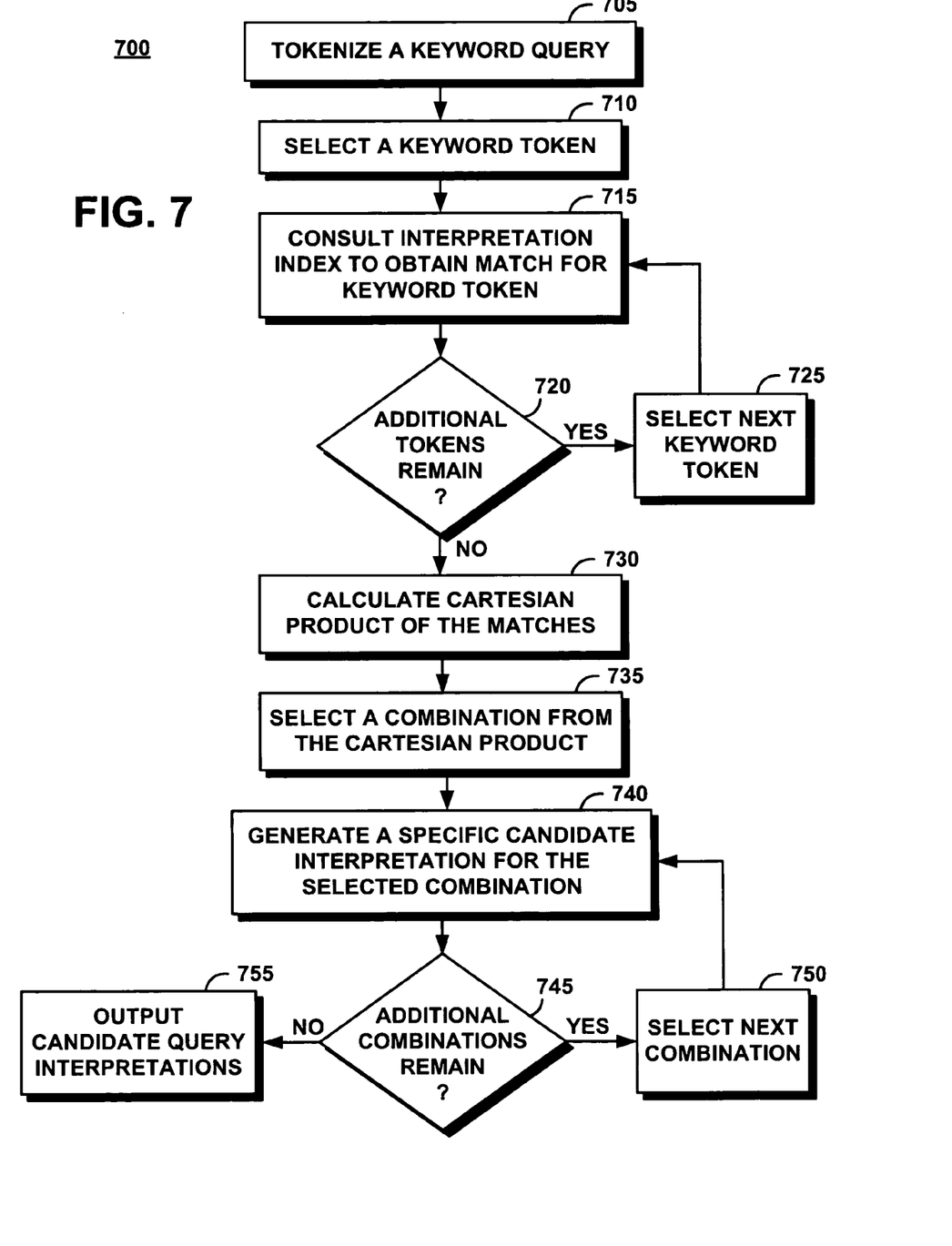
FIG. 7 is a process flow chart illustrating a method of operation of the query interpretation system of FIGS. 1 and 2 in generating a set of candidate interpretations for a keyword query.

FIG. 7 illustrates a method 700 by which interpreter 225 generates one or more candidate query interpretations from a keyword query. Interpreter 225 tokenizes a keyword query (step 705). Interpreter 225 selects a keyword token (step 710) and consults the interpretation index 205 to obtain a match for the keyword token (step 715). Interpreter 225 determines whether additional tokens remain for processing (decision step 720). If yes, interpreter 225 selects a next keyword token and repeats step 715 through step 725 until no additional keyword tokens remain for processing.

Interpreter 225 calculates the Cartesian product (in other words, all possible combinations) of the generated matches (step 730). Interpreter 225 selects a combination from the Cartesian product (step 735). Interpreter 225 generates a specific candidate interpretation for the selected combination (step 740). Interpreter 225 determines whether additional combinations remain for processing (decision step 745). If yes, interpreter 225 selects a next combination (step 750) and repeats step 740 through step 750 until no additional combinations remain for processing. Interpreter 225 outputs candidate query interpretations (step 755).

Figure 8:
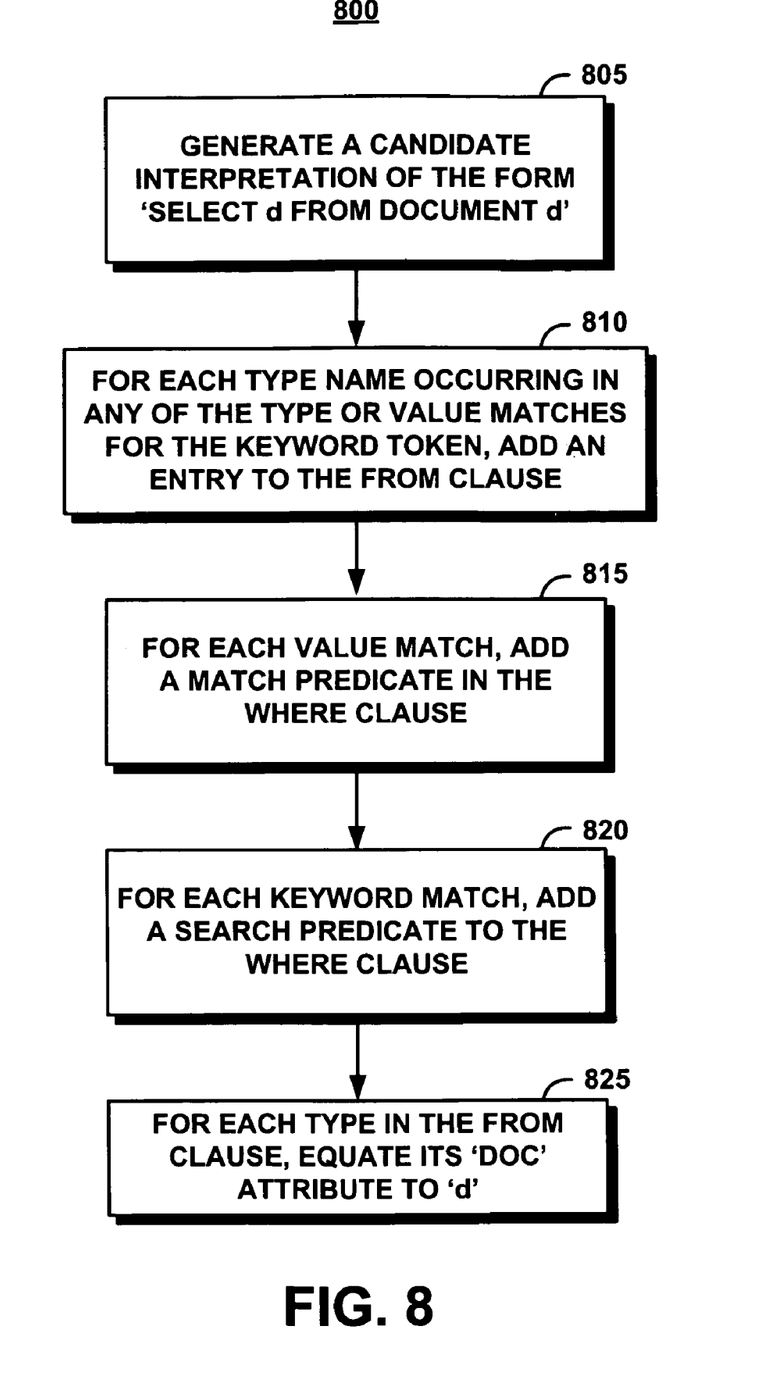
FIG. 8 is a process flow chart illustrating a method of operation of the query interpretation system of FIGS. 1 and 2 in generating a specific candidate interpretation in the set of candidate interpretations for a keyword query.

FIG. 8 illustrates a method 800 by which interpreter 225 generates a specific candidate interpretation for a keyword query. In the embodiment described in this invention, interpretations are represented using a SQL-like syntax. Therefore, an interpretation comprises a "select" clause, a "from" clause, and a "where" clause. Interpreter 225 generates a candidate interpretation with a select clause and a from clause (step 805):

select d from Document d

For each type name occurring in any of the type or value matches for a selected keyword token, interpreter 225 adds an entry to the from clause (step 810). For example, referring to query (1,1) previously discussed, the candidate query becomes:

select d from Document D, Person p, Organization o

For each value match, interpreter 225 adds a match predicate in the where clause (step 815). The match predicate comprises one or more operands. One operand is a variable for a corresponding type, followed by a "." and the name of the attribute in the value match. Another operand is a query token that corresponds to the value match. Referring again to exemplary query (1,1), the candidate query becomes:

select d from Document D, Person p, Organization o where

MATCH(p.name, Jane) AND MATCH(o.name, GM)

For each keyword match, interpreter 225 adds a search predicate to the where clause (step 820). Referring to exemplary query (2,1), the candidate query becomes:

```
select d
from Document d, Organization o
where
   MATCH(o.name, GM) AND SEARCH(d, "Jane")
```
For each type in the from clause, interpreter 225 equates doc attributes to d to ensure that all the concepts involved in the interpretation occur in the same document. Referring to exemplary query (1,1), the candidate query becomes:
```
select d
from Document d, Person p, Organization o
   where d=p.doc=o.doc AND
   MATCH(p.name, Jane) AND MATCH(o.name, GM)
```
Referring to exemplary query (2,1), the candidate query becomes:
```
select d
from Document d, Organization o
where d=o.doc AND MATCH(o.name, GM) AND
   SEARCH(d, "Jane")
```
An exemplary pseudocode for the query expansion process performed by the interpreter 225 is as follows:

```
INPUT (keyword query q = { k_1, ..., k_n }, interpretation index I)
ForEach i = 1.. n
    compute m_i = I(k_i) U { [kwd k_i] }
END ForEach
generated = { }
ForEach c = (c_1, c_2, ..., c_n) ∈ (m_1 × m_2 × .... × m_n)
    fromEntries = {"Document d"}
    predicates = { }
    keywords = { }
    ForEach i = 1..n
        c_i = [type T] => fromEntries = fromEntries U {T x_i} AND
        predicates = predicates U {x_i.doc = d}
        c_i = [val T.y] => fromEntries = fromEntries U {T x_i} AND
        predicates = predicates U {x_i.doc = d, MATCH(x_i.y, k_i)}
        c_i = [kwd k_i] => keywords = keywords U {k_i}
    END ForEach
    selectClause = "select d"
    /* construct a valid from clause using the
     * elements of the fromEntries set
     */
    fromClause = generateFromClause(fromEntries)
    /* construct a valid where clause by AND'ing
     * together all the predicates
     */
    whereClause = generateWhereClause(predicates, keywords)
    /* construct a valid query using the select,
     * from, and where clauses
     */
    currentQuery = generateQuery(selectClause,
                    fromClause, whereClause)
    generated = generated U {currentQuery}
END ForEach
OUTPUT generatedQueries
```

It is to be understood that the specific embodiments of the invention that have been described are merely illustrative of certain applications of the principle of the present invention. Numerous modifications may be made to the system and method for exploiting semantic annotations in executing keyword queries over a collection of text documents described herein without departing from the spirit and scope of the present invention. Moreover, while the present invention is described for illustration purpose only, in relation to documents or texts, it should be clear that the invention is similarly applicable to, for example, any type of objects. Moreover, while the present invention is described for illustration purpose only, in relation to a network such as, for example, the Internet, it should be clear that the invention is applicable as well to, for example, local access by users.

What is claimed is:

1. A processor-implemented method of exploiting a plurality of semantic annotations in executing a keyword query over a collection of data, the method comprising:

serializing the semantic annotations and storing them in an indexed storage device;

generating strings by text analysis engines;

generating a type system which models the semantic annotations, with the semantic annotations based on entity concepts and relationship concepts, wherein said entity concepts represent instances of data items that are mentioned at least one time in said collection of data and said relationship concepts represent associations between selected ones of said entity concepts and at least one other entity concept that represents another attribute of said selected entity concept;

generating an interpretation index which indexes the semantic annotations against the type system, such that names of types, attribute names, and attribute values are indexed;

expanding the keyword query into a plurality of intermediate structured queries, wherein one or more of keywords of the keyword query are matched by an interpreter with one or more entries in the interpretation index, utilizing matching techniques that retrieve approximate matches, and with the interpreter utilizing a shared ancestor rule which generates queries and discovers higher order relationships of keywords with matching types; wherein the intermediate queries include individual keywords and possible combinations of matches regarding each keyword, each of said intermediate queries representing separate queries having separate interpretations and said keyword query is represented by one of said plurality of intermediate queries, wherein the shared ancestor rule indicates that the keyword query contains keywords which have attributes that match each other with a specified type;

modifying selected ones of the intermediate queries based on at least one relationship concept to generate additional intermediate queries, wherein keywords in said intermediate queries are replaced by corresponding relationship concepts;

executing each of the plurality of intermediate queries to produce a list of data matching the keyword query of the executed intermediate query in terms of the type system;

merging the list of data matching the intermediate queries to produce a single output list; and producing annotations regarding analyzed documents with a plurality of text analysis engines with off-line processing.

2. The method of claim 1, wherein generating the type system comprises identifying types in the semantic annotations including entity concepts and relationship concepts.

3. The method of claim 2, wherein identifying types in the semantic annotations comprises identifying entity concepts in the semantic annotations types.

4. The method of claim 3, wherein identifying types in the semantic annotations comprises identifying relationship concepts in the semantic annotations types.

5. The method of claim 4, wherein identifying types in the semantic annotations comprises associating the relationship concepts with appropriate entity concepts.

6. The method of claim 4, wherein generating the interpretation index comprises matching any one or more of the types, the entity concepts, and the relationship concepts to each semantic annotation.

7. The method of claim 1, wherein generating the interpretation index comprises generating the interpretation index from the semantic annotations and the type system.

8. The method of claim 1, wherein generating the interpretation index comprises tokenizing strings in the semantic annotations.

9. The method of claim 1, wherein generating the interpretation index comprises assigning a keyword attribute to each semantic annotation.

10. The method of claim 1, wherein expanding the keyword query comprises tokenizing the keyword query into keyword tokens.

11. The method of claim 10, wherein expanding the keyword query comprises generating matches for the keyword tokens.

12. The method of claim 10, wherein expanding the keyword query comprises calculating a Cartesian product of the matches for the keyword tokens; and wherein the Cartesian product comprises combinations of the keywords tokens and matches.

13. The method of claim 12, wherein expanding the keyword query comprises forming a candidate interpretation of a combination.

14. The method of claim 13, wherein the candidate interpretation of the combination comprises a from clause, a where clause, and a match clause.

* * * * *